May 3, 1938.   O. THIEME   2,115,922
COMBINED TYPEWRITING AND COMPUTING MACHINE
Original Filed July 30, 1931   3 Sheets-Sheet 2

INVENTOR:
Otto Thieme
BY B.C. Stickney
ATTORNEY:

May 3, 1938.  O. THIEME  2,115,922

COMBINED TYPEWRITING AND COMPUTING MACHINE

Original Filed July 30, 1931   3 Sheets—Sheet 3

INVENTOR:
Otto Thieme
BY B. C. Stickney
ATTORNEY.

Patented May 3, 1938

2,115,922

UNITED STATES PATENT OFFICE 2,115,922

COMBINED TYPEWRITING AND COMPUTING MACHINE

Otto Thieme, Hartford, Conn., assignor, by mesne assignments, to Underwood Elliott Fisher Company, New York, N. Y., a corporation of Delaware Application July 30, 1931, Serial No. 553,937
Renewed September 16, 1936

27 Claims. (Cl. 235—59)

This invention relates to improvements in combined typewriting and computing machines, of the kind in which a master wheel is controlled by the numeral-keys of the typewriter, and in which the carriage of the typewriter controls the relative step-by-step denominational movements between the master wheel and the totalizer.

The invention is illustrated in a machine in which a truck is connected to the typewriter-carriage, and carries a row of totalizers, and in which the master wheel is mounted upon the machine-frame, and is rotated by means of differential indexing mechanism, which is driven by the keys.

In a machine of this type, it has been proposed to fix a second master wheel upon the drive-shaft, and to swing one of the totalizers into and out of mesh with the second master wheel; but this is open to objection, as it is inconvenient to mount and adjust the totalizer. It has also been proposed to connect the second master wheel by a clutch to the first master wheel, but this necessitated looseness of connection, lateral play, and complication of action; and room in this class of machines is too restricted for a clutch.

According to one of the features of the present improvements, a second master wheel is rendered available at will without incurring any of the foregoing objections. The totalizer is mounted rigidly and adjustably upon the truck, like other totalizers. The second master wheel is rigidly connected to the first to rotate therewith, without play or backlash or side-shake. This result is obtained by mounting the second master wheel upon a separate shaft-section, which abuts end to end against the shaft of the main master wheel, the second shaft-section being connected by a universal joint to the main shaft, and being depressible to carry the second master wheel down out of mesh with its totalizer-gears, thus silencing the second master wheel, which, however, may still rotate idly during the operation of the main master wheel.

Another of the features of the invention relates to means for correcting the spiral which occurs in the totalizer whenever the carrying-over operation extends along many dials. The realigning of the dials is effected by a universal tooth or aligning bar, which is of novel construction and operation, and highly efficient in practice. One novel feature is that the aligner is normally in its effective position; and advantage is taken of this feature to shorten the aligning bar materially, so that it needs only to be long enough to span three or four of the denominational gears in the totalizer; and hence the aligner is more easily operated, and does not appreciably burden the numeral-keys of the typewriter.

Since the aligning bar or tooth stands normally in effective position within the notches of the totalizer-wheels, it results that when the carriage is moved by hand in either direction, the aligner tooth or bar engages successively the teeth of all wheels that pass by it.

The aligner-bar is automatically dropped from the wheels in order to permit them to be operable by the usual carry-over mechanism.

The aligner-bar must rise to effective position promptly, and for this stroke it is controlled by a rack on the carriage or truck.

There is also a device provided for holding the aligner-bar in mesh with the teeth normally independently of said rack, so that the carriage may move without vibrating the aligner-bar.

Another feature is in the nature of an interlock between the mechanism which silences the second master wheel and the differential mechanism which rotates the master wheel, so that simultaneous operation of both mechanisms cannot occur.

Another feature of the invention overcomes the difficulty found in the two-armed key-lever which has been heretofore employed for shifting the machine between addition and subtraction. The usual two-armed lever is depressible at either end by downward motion of the finger of the operator, and it is also liftable at either end by upward motion of the finger. In manipulation of the machine, it is found that the operator is apt to move this lever unconsciously and accidentally, thereby changing the state of computation without knowing about it; and hence errors arise in the computation which are difficult to trace. One of the features of the invention is the employment of means to avoid these accidents, and for this purpose there are employed addition and subtraction keys which are in the form of studs that slide in holes in the fixed frame of the machine, and can only be operated by pushing them back, so that no upward or downward or lateral movements of the fingers of the operator can cause accidental or unconscious shifting of the machine to addition or subtraction.

Other features and advantages will hereinafter appear.

In the accompanying drawings,

Figure 9 is a sectional front view of three totalizers, flexibly coupled master gears, their indexing connections, shifting means to change the direction of rotation for the gears, and mechanism shifted to disable the second master gear.

Figures 10 and 11 show details of constructing the universal joint in the master-gear shaft.

Figure 12 is a top view of a section of the indexing frame, showing the assemblage of two adjoining aligning bars for the totalizers.

The machine includes the usual Underwood typewriting mechanism, an indexing mechanism operated by the numeral-keys of the typewriter, and totalizers mounted upon a truck, secured to travel with the carriage of the typewriter to be operated by a stationary master gear driven by the indexing mechanism.

The typewriting mechanism may include numeral-keys 20, attached to levers 21 fulcrumed upon rod 22 and held up by springs 23. Each key-lever may have a stud 24 to engage a slot 25 in the short arm of a bell-crank 26 fulcrumed at 27, the upper free end having a stud 28 projecting into a slot 29 in type-bar 30. The latter is fulcrumed at 31, and provided with types 32 to be thrown against platen 33, when a key is depressed. The platen 33 may be rotatably mounted in carriage 34 having a roller 35 running upon a stationary front rail 36, and a pair of rear lugs 37 sliding upon a stationary rod 38.

The carriage 34 may be propelled by spring-motor 39, the letter-spacing being controlled by a carriage-driven toothed wheel 40, and escapement-dogs 41 controlled by a universal bar 42 actuated by the type-bars.

The typewriter-carriage 34 is connected by arms 43 to a truck 44, including a grooved bar 45 running upon rolls 46 in a raceway provided in upper edge of a track-bar 47 secured to the machine-frame above the keys 20. To prevent displacement of the rail 45, a center roller 48 is journaled on a bracket 49 that is secured to bar 47, the roll bearing upon the flat top face of the rail 45, in line with the main master wheel.

A plate 50, having beveled upper and lower edges to form ways for the assembly and adjustment of a series of totalizers 51, hanging thereon, is secured to the front of truck-bar 45.

Each totalizer has a bottom roll 52 traveling within a channel-rail 53 secured to the upper front of the indexing frame 54, for supporting both the totalizer and the truck.

The truck 44 may also have a totalizer-locating rack-bar 55 which is adjustably secured to the rear lower face of the hanger-plate 50. The teeth of the rack have letter-space pitch, and the rack is formed with a longitudinal ledge 56 to slide under an adjacent working face or ledge cut along the bar 47, to further steady the truck.

Each totalizer or unit 51 includes registering wheels 57, idler gears 58, carrying gears 59, star-wheels 60 and series of controlling levers 61.

As a totalizer 51 passes through a computing zone, the gears 59, beginning with the highest denomination, mesh seriatim with a main master gear 63, which is rotated by the indexing mechanism operated by the numeral-keys. Proper meshing of the gears 59 with the master gear is insured by an aligning tooth 62 that is secured to the frame 54 adjacent the main master gear 63.

The indexing frame 54 includes brackets 64, 65, 66, 67, and 68, all fixed to the track-bar 47 and joined together along the front by a tie-bar 69. Upon or within this frame are mounted all the actuating mechanisms to rotate the master gear. The entire device is assembled as a unit to the typewriter frame.

Each numeral-key 1 to 9 has a connection 70 to one of a series of indexing cam-arms 71, mounted upon a stationary rod 72 and provided with individual restoring springs 73, and having differentiated individual cam-slots 74 to engage wrists 75 upon crank-arms 76. The latter are fixed to a rock-shaft 77, journaled in the two end brackets 64 and 68. The differential cam-slots 74 are formed as eccentrics to shaft 77, and they vary in eccentricity, so that from uniform operations of the numeral-keys 1 to 9, differentiated rocking motions are transmitted to the shaft 77, corresponding to the computative values of the numeral-keys depressed.

Figures 9, 10:
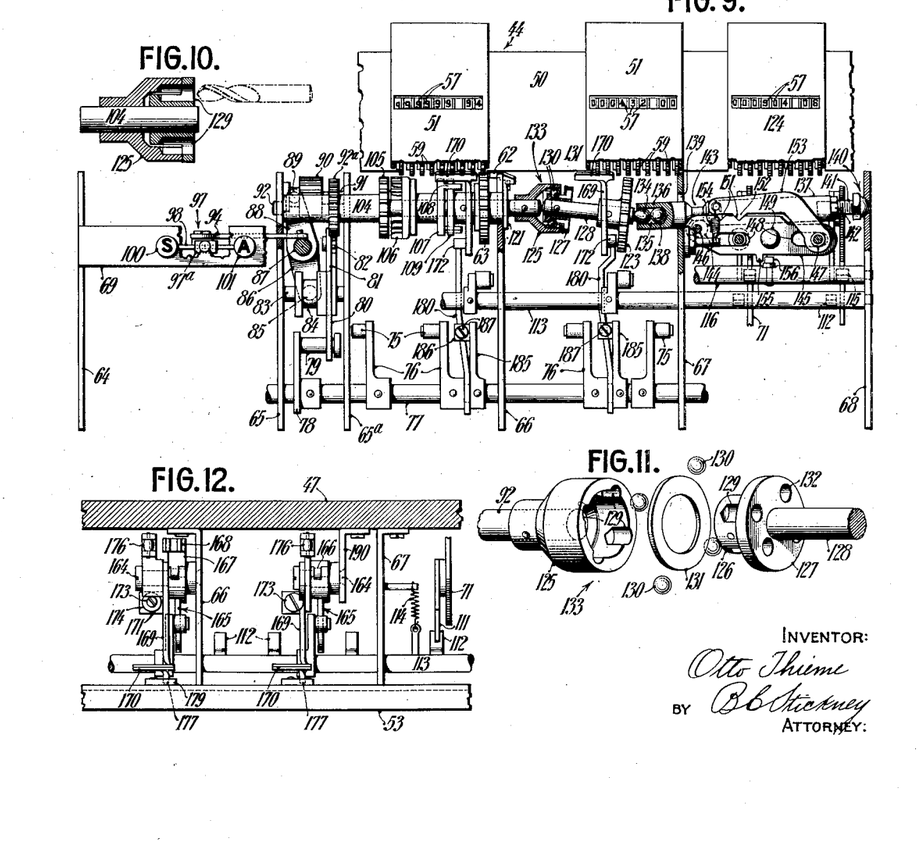

Secured to the indexing shaft 77 is a master-wheel-driving arm 78, see Figure 9, having a long wrist 79 connected by a link 80 to a wrist 81 on a toothed sector 82, which rotates the master-wheel shaft and is mounted upon a short shaft 83 journaled in brackets 65 and 65ᵃ.

The sector may be slidden along said shaft 83, in changing from addition to subtraction, the link 80 at the same time idly sliding along the wrist 79. For this purpose, the gear-sector has a hub grooved at 84 to receive the end of a pin 85 upon the end of a shifting arm 86 depending from a manipulable short shaft 87 having bearings in bar 47 and tie-bar 69. The shaft 87 also has an upright arm 88 with a wrist 89 engaging a back-gear 90 slidable along a shaft 91, supported upon brackets 65 and 65ᵃ.

The pinion 90 is connectible between the sector 82 and a pinion 92ᵃ that is fixed to a master-wheel shaft 92, to be driven forwardly or backwardly by the gear-sector 82. To effect the simultaneous opposite shifting of the sector 82 and the pinion 90 by the arms 86 and 88, the shaft 87, to which said arms are fast, may be provided with a pin 93, connected by a link 94, passing through slot 95 in bracket 65, to an arm 96 of a three-armed bell-crank 97, fulcrumed upon a slotted stud 97ᵃ riveted to the rear face of the bar 69. The arms 98 and 99 may be horizontal or parallel with bar 69, and their free ends may be pivotally connected to key-stems 100 and 101 that pass through suitable bearing holes in the bar 69 and project forwardly from said bar, the rods being designated as S for substraction and A for addition.

When the A-rod key is pressed back, the shaft 87 and the two crank-arms 86 and 88 are rocked to shift the gear-sector 82 sidewise into mesh with pinion 92ᵃ. At this time the back-pinion 90 is idle, and the master-wheel shaft 92 rotates in the direction for addition.

When the S key 100 is pressed, the shaft 87 and arms 86 and 88 will shift the sector 82 laterally out of mesh with pinion 92ᵃ and into train with the back-pinion 90. Moreover the latter is at the same time shifted into mesh with the master-shaft pinion 92ᵃ. The shaft 92 will rotate reversely for subtraction.

Each of these positions of the shaft 87 may be maintained by a detent-arm 102 fast to the shaft and engageable with notches 103 in the rear of bar 69.

The three-armed bell-crank has opposite arms to which forwardly-extending sliding key-heads are pivoted, said bell-crank being pivoted to swing in a horizontal plane, and the guide 69 in front of said bell-crank supports said sliding key-heads. The bell-crank has a midway arm connected to shift the addition and subtraction train. The key-heads 100, 101 are inoperable by downward, upward or lateral movements of the fingers, whereby the heretofore existing liability of accidental shifting of the subtraction-setting train is overcome, and mistakes in computation are avoided.

Figures 1, 2, 3, 4:
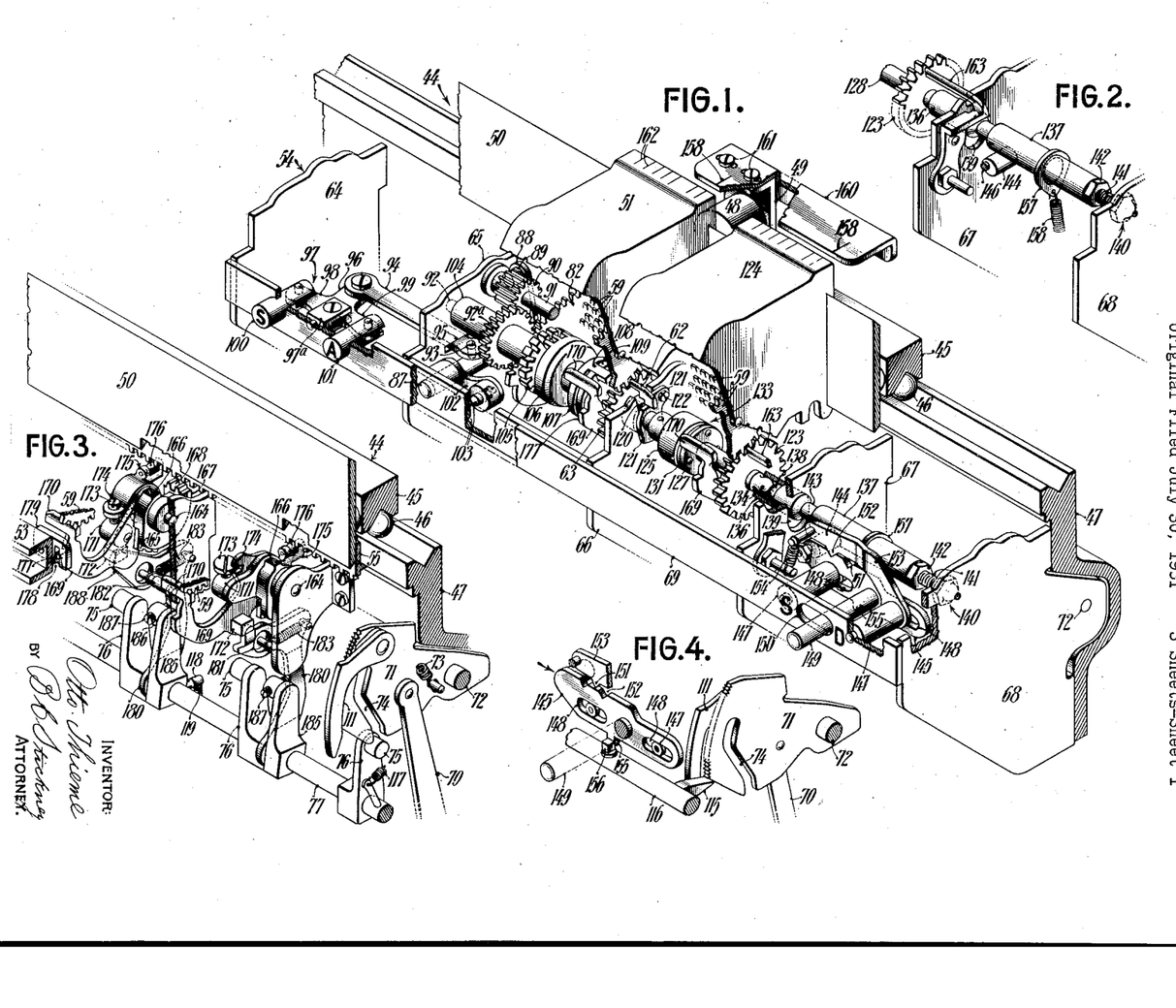
Figure 1 is a front perspective view of the indexing mechanism with its enclosing frame broken away, showing a drive-shaft having two master gears coupled thereon, shown in mesh with the gears of two totalizers carried side by side upon a truck, and means to silence one master gear at will.
Figure 2 is a fragmentary view, in perspective, of the main master gear and connections.
Figure 3 is a perspective view, from the front, of portions of the key-operated indexing mechanism and the alignment of the gears in two adjoining totalizers.
Figure 4 illustrates an interlock to prevent the operation of the master-gear-indexing mechanism by the numeral-keys, until the master-gear-shifting mechanism has disabled the gear.

As shown in Figure 1, the master-wheel shaft 92 may have bearings in the brackets 65 and 66, and between the two brackets the pinion 92ᵃ may be arranged with spacing hubs 104 to rotate freely upon the shaft 92, one hub being formed with a toothed clutch-member 105. A clutch-member 106 is also loose upon the shaft 92, and has two or more teeth that are diametrically opposite, said teeth interlocking with the teeth of the member 105 when 106 is shifted along the shaft 92.

The shiftable clutch-member 106 may be joined by a hub to a head 107 that has one or more projecting splines 108 that slide within peripheral notches formed in a companion head 109 that is fast to master-wheel shaft 92. When the clutch-member 106 is shifted leftward from Figure 1 into mesh with member 105, the splines 108 will slip idly through the notches in head 109, but will not become disconnected therefrom, so that, when clutch-member 105 drives member 106, the splines 108 will drive the head 109; and this, in turn, will drive a master wheel 63 fast to the head 109. The master wheel may be fast to the shaft 92, upon which the pinion 92ᵃ etc. are loose.

Figures 14, 15, 16:
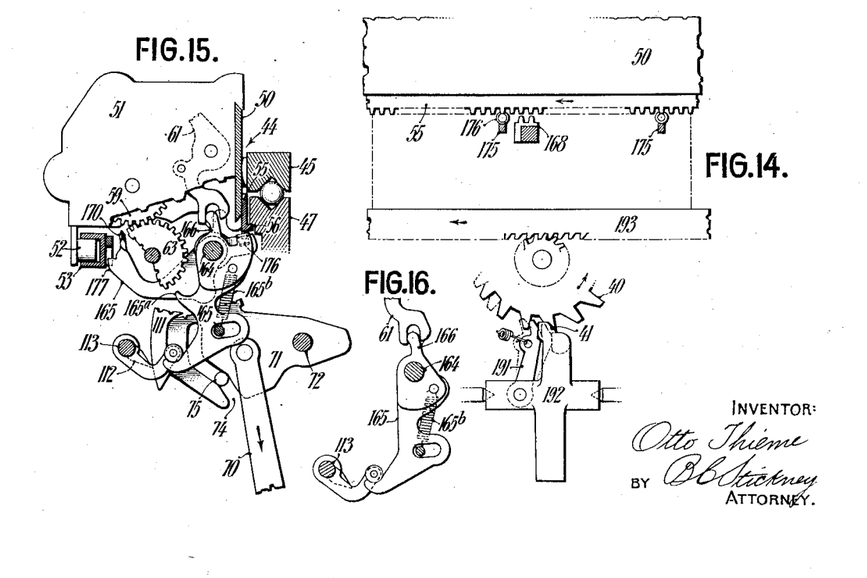
Figure 14 is a diagrammatic front elevation showing steps of operation that have taken place in Figure 13 while the carriage letter spaces.
Figure 15 illustrates the manner of releasing the normally locked register-gears and the master gears upon the initial depression of a key and before motion has been transmitted to the master gears.
Figure 16 shows the dog-operating lever of Figure 15, modified to meet the requirements for a second master gear and a second gear-aligning means for the cross-totalizer.

Each of the indexing arms 71 has a cam shoe or tongue 111 to engage one of a series of nine dogs 112, Figure 15, all secured to a rock-shaft 113, having bearings in brackets 64 and 68. This shaft is normally held in midway position by a double-acting spring 114 (Figure 12), but it may be rocked to the position at Figure 15 by the initial swing of the tongue 111, as the associated differential cam 74 is about to vibrate the wrist 75 to rock the index-shaft 77.

The rocking of the shaft 113 operates a train of parts to shift the clutch-member 106 into interlock with the toothed clutch-member 105, so that, when the index-shaft 77 rotates the pinion 92ᵃ, the master gear 63 will be driven by the pinion until the end of the shoe 111 rides off from dog 112, whereupon the shaft 113 is restored by the spring 114, so that the member 106 withdraws from 105 at the end of the downward stroke of the numeral-key. The train of mechanism between the shaft 113 and the sliding clutch-member 106 may be substantially the same as disclosed in my pending application, Serial No. 468,175, filed July 15, 1930 (now Patent No. 2,020,340, dated November 12, 1935).

Each indexing arm 71 is formed with fine peripheral teeth that engage pawls 115 to rock a tensioned shaft 116, and also operate as individual full-stroke devices for each arm 71, in opposite directions.

The index-arms 76 are arranged in a row along the shaft 77. The rocking of the shaft may flex a returning spring 117, and the return of the shaft may be terminated by a pin 118 engaging a stop-screw 119, Figure 3.

In order to permit disassembling of the master wheel 63 and its shaft 92 and other parts from the machine as a unit, the bracket 66 may be provided with an open slot or groove 120, Figure 1, and the shaft 92 may have a bearing hole in a keeper 121 that is secured to the face of the bracket 66 by a screw 122. It will be understood that there is a bottom bearing in the bracket 66 for the shaft to rest upon, and that the keeper 121 prevents dislodgment of the shaft until the screw 122 is first removed.

A second master wheel 123 is operable in unison with the master wheel 63, so that two totalizers may be operated at once.

Provision is made for disabling the second master wheel without disconnecting it from the main master-wheel shaft. To this end, the master-wheel shaft and the second shaft may consist of two sections connected end to end by a universal joint. One end of the second shaft has an up-and-down movement to clear the second master wheel from the gears on the carriage, as may be required.

To the end of the main master shaft 92, at the right of the keeper 121, is secured a cup or housing 125, in which works the hub 126 of a head 127 that is secured to a shaft-section 128 which carries the second master wheel 123. The housing 125 drives the head 127 and shaft 128. Four evenly-spaced holes 129 may be drilled half way in the walls of the housing and half way in the outer periphery of the hub 126. The method of drilling these holes in a direction longitudinally of the shaft is shown at Figure 10. The holes 129 formed in the part 125 combine with those in 126—127, to serve as raceways. The parts may be assembled, as shown in Figure 9, with four driving balls 130 held in the four holes 129 by a washer 131 placed over hub 126 and against the inner face of the head 127. The washer fits upon the hub and covers the holes 129 to prevent the balls from escaping. In this manner is built up a universal joint 133 between the main master-wheel shaft and the shaft-section 128 carrying the second master wheel 123.

Shaft-section 128 may be formed with a ball-shaped end 134 (Figure 9), housed within a bearing 135 in the inner end 136 of a swing-rod 137, the bearing 135 containing a ball 138 to bear against the shaft-end 134 to prevent endwise displacement. The adjoining ends of the shaft-sections 92 and 128 may be rounded as shown, to permit the shaft-section 128 to rise and fall freely, but there is no endwise play of shaft 128 or its master wheel 123 when the latter is elevated.

The housing 136 on rod 137 may be guided in a vertical slot 139 in bracket 67. The outer end of rod 137 may be aligned with the shaft 92 by means of a ball-and-socket fitting 140 with the bracket 68. A jack-screw 141 is tapped into the end of rod 137, and locked by nut 142 after the rod has been adjusted closely between the bracket 68 and the end 134 of shaft-section 128.

The rod 137 may have a V-groove 143 for a roller 144 which occupies the groove when the rod is down. The roller 144 is rigidly mounted on a slide 145 to shift it along the rod 137 and cause it to ride out of the groove 143 to lift the housing 136 of the rod 137 and thereby raise the second master wheel 123 to operative position for meshing with the gears 59 and to lock the master wheel in this position. The roller 144 has an eccentric stud 146 whereby it is adjustably mounted on the slide 145 with respect to the rod 137. The slide 145 may be carried upon the reduced ends of two studs 147. These studs enter slots 148 in the slide, and are secured to the inner face of tie-bar 69. The slide 145 may also have a finger-piece 149 passing through a slot 150 in bar 69, and manually operable between two positions, which may be marked S and D, to indicate that a single master gear or the double master gears are in train with their totalizers.

To retain the slide 145 at either of these S or D positions, notches 151 may be formed in the slide to be engaged by a V-detent 152 on an arm 153 swingable upon one stud 147 and under the tension of a spring 154 toward the notches.

It will be seen that the totalizer 124 may be rigidly secured to the carrying plate 50, the same as the other totalizers, while it may still remain connectible to and disconnectible from the second master wheel 123; so that there is no error in computation that might arise from loose mounting of the totalizer 124. It will also be seen that the master wheel 123 has no rotative play relatively to the master wheel 63, thereby avoiding the liability to errors, which would be apt to occur when master wheels are clutched to a shaft by loose clutching connections. Therefore the operation of the totalizer 124 is equally accurate with the operation of the totalizer 51. This result is secured by parts which are inexpensive and compact, and readily assembled in the restricted space of this class of machine. When the master wheel 123 is up, the shaft-sections are in line, and there is no endwise play of either shaft-section, so that no liability of errors in computation arises, because of engagement of the master wheel 123 with the wrong gear of the totalizer.

Figure 6:
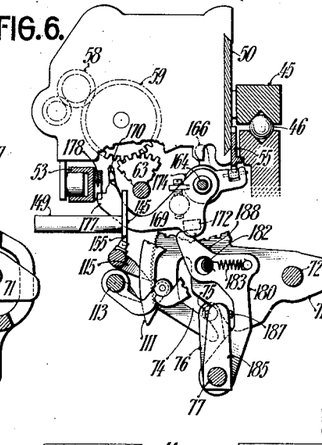
Figure 6 is a view similar to Figure 5, showing other parts positioned by the initial depression of a numeral-key.
Figure 7:
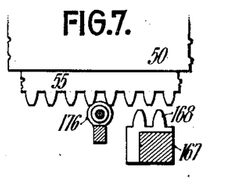
Figure 7 shows the same parts as Figure 8, according to the normal settings of Figure 5.
Figure 8:
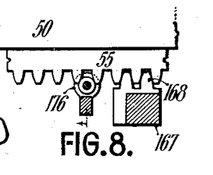
Figure 8 shows parts interlocking with the rack of the totalizer-truck under the setting of Figure 6.

The slide 145 may have a tongue or lug 155, Figure 4, and the rock-shaft 116 may have a vertical stud 156. When the slide 145 is at either one of its two extreme positions, with the second master wheel 123 up or down, the stud 156 will rock under the slide, at either side of lug 155, and block the reverse movement of slide 145, as shown in Figure 6. The slide cannot be reversed before the rock-shaft 116 has been released by the indexing cam 71 at the end of the full down stroke of a numeral-key. The master wheel 123 must therefore remain in mesh until the drive stroke of the key is completed.

During the shifting of the slide 145 in either direction, the lug 155 passes in rear of stud 156, as shown at Figure 4, and prevents the rocking of the shaft 116 and the swinging of the indexing cam 71 and the depression of a numeral-key, until the slide 145 has made a full stroke in either one direction or the other. In this way, error-preventing measures are established in connection with the control of master gear 123.

Upon the rod 137 may be hung a ring or hook 157, in which is caught a spring 158, see Figure 2, to draw the rod and master wheel 123 downward when released by sliding the mount 145 until the roller 144 enters the groove 143.

The spacing of the master wheels 63 and 123 is fixed for a minimum spacing between two adjoining totalizers, so that the master wheels will simultaneously engage gears 59 of the same denomination in the totalizers. Hence it is essential to locate the two totalizers accurately and positively with relation to each other upon the plate 50 of the truck.

To this end, two pointers 159 are provided on a plate 160, secured to the bracket 49 on the bar 47 by means of adjusting screws 161. The totalizers to be simultaneously actuated are arranged so that the pointers 159 indicate similar denominations on scales 162 of the totalizers 51 and 124, as shown at Figure 1.

The teeth of the denominational trains or gears 59 move through the teeth of the stationary master wheels as the carriage feeds. An aligning plow-tooth 163 may be secured to the framing close to each master wheel, to line up the teeth of the advancing totalizer-gears 59 for free passage through the teeth of the master wheels before the master wheels are rotated.

The highest gears 59 of the adjoining totalizers 51 and 124 first enter the driving fields of the master wheels, and the travel of the carriage progresses until the gears 59 of lowest denomination have been operated. The series of gears 59 and their dials are apt to present a spiral arrangement, which is objectionable. In my prior application, filed June 18, 1928, Serial No. 286,218, (now Patent No. 1,971,544, dated August 28, 1934) a long aligning bar was provided to engage all the gears to align them after each computation set up in a totalizer. In my pending application, Serial No. 468,175, an aligning bar consists of two sections, each section having an individual control for a common end.

According to certain features of the present improvements, an aligning tooth or bar stands normally in effective position in the notches of totalizer-wheels. If the carriage is moved by hand in either direction, the aligner-bar engages successively the teeth of all wheels that pass by it. The aligner-bar needs to be only long enough to span four denominations, namely, the four next above the one which is in engagement with the master wheel, thus making five wheels whose position is positively aligned. This practically sufficient, as the remaining wheels (of higher denominations) will become automatically aligned by said bar the next time that the carriage is returned to the right.

The aligner-bar has to be dropped from the wheels in order to permit them to be responsive to the usual carry-over mechanism, when the master wheel is driving, at the depression of the numeral-key. This withdrawal of the aligner-bar is effected automatcially, by means of a train which is set into motion at the first part of the depression of the numeral-key. Hence the aligner-bar is in idle position during the main portion of the down stroke of the key.

It is desired, however, for the aligner-bar to rise promptly to effective position at the initial part of the up stroke of the key. Accordingly the up stroke of the aligner-bar is controlled by means of a rack on the carriage, or on the totalizer truck. The carriage and truck start in motion promptly at the first part of the up stroke of the key. The rack on the truck has a camming action upon the lever which carries the aligner-bar, and throws the aligner-bar into mesh promptly and before the key reaches the concluding portion of its up stroke.

There is also a device provided, independently of said rack, for holding the aligner-bar in mesh with the key normally, so that the carriage and truck may be manipulated to the right or left freely, as may be required, without causing the aligner-bar to vibrate.

It will therefore be understood that instead of aligning the whole series of gears at the same time, and after the full computation has been entered in the totalizer, it is a feature of this invention to align the operated gears 59 immediately after each digit has been computed, and to maintain the aligning bar in operative or effective position except during the short interval when the master wheel is actually rotating the carrying gear. The aligning of a few wheels adjacent to the master wheel, by the present method, will practically be sufficient, and any spirality in the higher wheels will be overcome. Since the aligning bar is normally in a tooth-aligning position, the movement of the carriage towards the right will bring into use the left-hand beveled end of the aligning bar constituting a second plow-tooth to bring all the remaining gears into alignment.

To the bracket 66 may be secured a mount in the form of a stud 164, Figure 3, to support various levers which are retained by a screw threaded into the end of the stud, so that each lever may rock on the stud as required. Nearest to the bracket 66 is the first lever 165 of the assembly. This lever may include an arm 166 operable to vibrate seriatim the locking levers 61 in the totalizer, to free the gears 59. A second arm 167 may have dogging teeth 168.

The lever 165 is also formed with a tooth 165ª that normally interlocks with teeth of master wheel 63. This tooth 165ª is rocked out by the shaft 113 during the initial portion of the stroke of an indexing cam-arm 71, to release the master gear, and said teeth 168 are shifted into interlock with rack 55, to hold truck 44 and its totalizers stationary during the ensuing rotation of the master wheel to drive a computing gear, as described in my said pending application No. 468,175.

Next to the lever 165 on the mount 164 is assembled an aligning lever 169, Figure 3, which extends forwardly and carries a long V-edged and V-pointed laterally-projecting tooth or aligning bar 170, operable to force its way between teeth of adjoining gears 59, to align them.

The lever 169 has a mount 171. A lug 172 projects from the side of the lever. The mount 171 has a screw 173 threaded therein to serve as a jack-screw upon one arm 174 of a lever 175 that is also assembled upon the end of the mount 164, and is provided with a roller 176 under the teeth of rack 55 on the truck 45. The levers 169 and 175 rock upon the mount 164, the lever 169 for aligning the gears 59, and the lever 175 for entering the spaces between the teeth of rack 55, to be cammed out by the teeth seriatim. The screw 173 is adjustable to determine accurately the proper relative positions of the aligning bar 170 and the roller 176.

The forward end of the aligning lever 169 may be guided by an ear 177 thereon, working in a slot 178 in a plate 179 that is fixed to the rear face of channeled rail 53. The combined levers 169 and 175 vibrate freely upon stud 164, and the overhanging weight of lever 169 tends to depress the same and to throw the roller 176 up between the teeth of the rack 55.

The rock-shaft 77, which is operated by each indexing cam-arm 71, may have a latch or a lever 180 loosely mounted thereon for a movement limited by a hole 181 therein engaging a stop-pin 182 on bracket 66. The latch 180 is operated in one direction by a spring 183, tending to force the latch 180 forward to the idle position at Figure 6.

The shaft 77 may also have a special arm 185, Figure 3, secured thereto to support a mount 186 for a stop-screw 187, which is opposed to the action of spring 183. The stop-screw is engaged by the edge of the latch 180, Figure 5, so that the latch 180 will move to accompany the swing of the arm 185 until arrested by pin 182, Figure 6.

Figure 5:
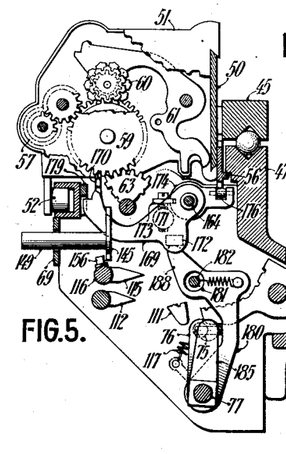
Figure 5 is a vertical cross-section through a totalizer and the indexing frame, showing parts in normal positions.

The latch 180 is formed with a round nose 188 to cam under the lug 172 of lever 169, and thereby lift said lever into the position at Figure 5, where the parts are shown in normal positions, with the beveled bar 170 aligning the teeth of gears 59; and with the roller 176 withdrawn from the teeth of rack 55.

It may be observed that the shaft 77 and its parts are restorable to normal rearward positions by the spring 117, which overpowers the spring 183, so that the screw 187 will operate to pick up the latch 180 from the idle position at Figure 6 and swing it to the effective position at Figure 5, by reason of the camming action of the extension 188 upon the lug 172 of said latch.

This mechanism is described in connection with a regular totalizer 51. The grand totalizer 124 is similar to 51, and is operable by master wheel 123 at the same time. Duplicate parts are shown side by side, and are given similar numerals of reference. The shaft 77 carries two arms 185, each arm to operate a latch 180, which in turn operates a lever 169 to align simultaneously the gears 59 in the totalizers 51 and 124. Each lever 169 has a roller 176 to underlie the teeth of the rack 55, and the rollers simultaneously enter and leave the notches between the teeth of the rack. Each lever 165 carries a master dog to operate similar parts in the two totalizers 51 and 124, seriatim; but only one lever needs to have the rack-dogging teeth 168 shown at Figure 12. One lever 165 may have the tooth 165ª (Figure 15) to lock both master wheels. The levers 165 may have individual restoring springs 165ᵇ.

The mode of operation is as follows: With the mechanism in normal position, as shown in Figures 1, 3 and 5, the aligning bars 170 are in effective positions for the gears 59, whether the totalizers 51 and 124 are in computing zones or not. Each aligner 170 is beveled at both ends, so that it will plow between the teeth of the gears of all the totalizers when the carriage runs to right or left. The shifter 149—145 holds both master gears 63 and 123 in horizontal alignment. The roller 176 and dogging teeth 168 stand normally withdrawn from the teeth of the rack 55 on the truck 44.

The carriage 34 is tabulated to a position when the two master wheels 63 and 123 will engage the gears 59 of highest denomination in the totalizers 51 and 124. The depression of a numeral-key 20, besides lifting the type-bar to print, vibrates its indexing cam-arm 71 from the position at Figure 5 to that at Figure 6, when the shaft 113 is rocked by the cam-shoe 111, to vibrate the two levers 165, and to vibrate their master dogs 166 to release the carryover mechanism of both totalizers, and vibrate the teeth 168 into carriage-holding interlock with the rack 55.

The same initial movement of the indexing arm 71 to the position at Figure 6, vibrates the shaft 116 for the purpose of closing the clutch-members 105 and 106, thereby connecting the master gear 63 to be rotated by shaft 92, which will also rotate the shaft 128 and the master gear 123. Then shaft 77 is rocked by the camming action of the slot 74 of the arm 71, upon a stud 75. The initial rocking of the shaft 77 withdraws the stop-screws 187, to release the latches 180 to permit their springs 183 to withdraw the noses 188 from under the lugs 172 on the two levers 169, so that by the time rotation is transmitted to the master-gear-shaft 92, the aligning teeth 170 will be withdrawn from the gears 59 of both totalizers 51 and 124. The rollers 176 on both levers 169 will enter spaces between adjoining teeth on the rack 55, to terminate the drop of said aligning levers.

The continued downward motion of the key gives rotation to the shaft 92, and rotates both master gears 63 and 123, to accumulate the corresponding digital value upon the gears 59. Near the end of the down stroke of the key, and after its movement has been transmitted to the master gears 110 and 123, the dog 112 of shaft 113 will ride off the end of the cam-shoe 111, and the reverse rotation of said shaft by a spring 165b will release the tooth 165a to re-lock master gear 63.

The dog 115 of shaft 116 will ride off from the actuator 71, to open the clutch-members 105 and 106 between the master gear 63 and the shaft 92, and levers 61 will be released by the master dogs 166, to restore the gears 60, and the arm 167 will withdraw the dogging teeth 168 from the rack 55.

At the end of the down stroke of the key, a tooth of the carriage-escapement-wheel 40 passes from stepping dog 191 to holding dog 41 of the escapement-rocker 192; and the dog 191 steps to a forward position, to intercept the next wheel-tooth, which advances when the key is released by the finger. In the Underwood escapement shown, there is practically no drop or lost motion from the face of the stepping dog to the face of the holding dog; and the holding dog has a beveled face for the escapement-tooth to strike and bear against under carriage-tension, to oppose the finger pressure upon the key.

Figure 13:
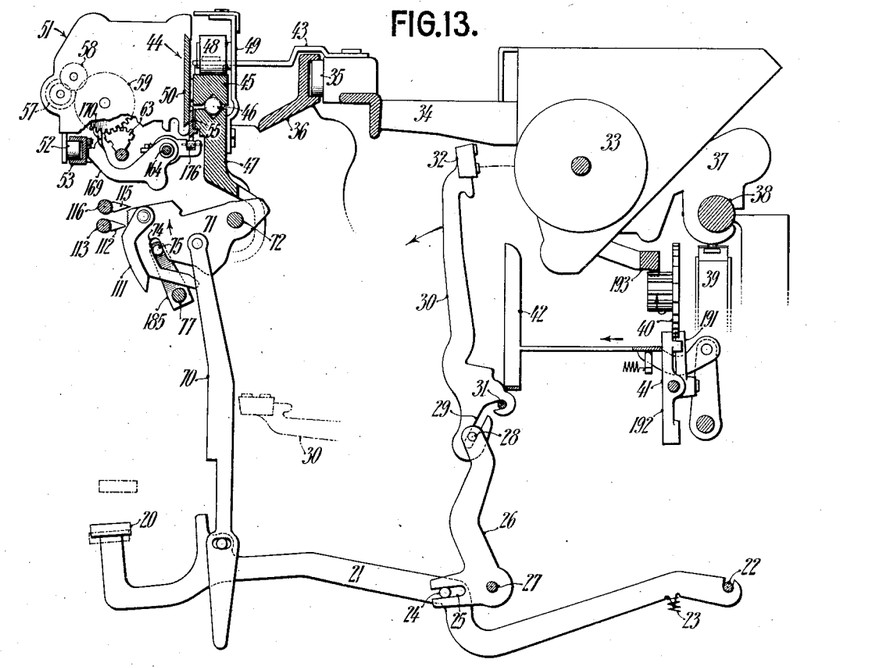
Figure 13 is a sectional side elevation showing the positions of certain connected parts of mechanisms after a type-bar has been driven against the platen and recoiled to the full-line position, during which operation there is a release of the carriage-holding dog, and the carriage-stepping dog becomes effective. The letter-feed movement of the carriage forces the aligning bar into and out of engagement with the teeth of the totalizer-gears.

Upon the release of the key by the finger, the escapement-tooth slides off from the bevel of the holding dog 41, which is released to the carriage-tension; and the next advancing escapement-wheel tooth will engage the stepping dog 191, and thus the carriage will be advanced one letter-space. This carriage-feed takes place as soon as the type-bar 30 has started back from the platen, Figure 13. At this time the stepping dog 191 has passed through the three positions indicated in full and dotted lines in Figure 14.

During this movement of carriage-feed rack 193 by the operation of the stepping dog, both rollers 176 that occupied the notches between two teeth of the rack 55 ride over the advancing teeth of the rack, first resting upon the faces of the two teeth as shown at Figure 14, and then dropping from said two teeth into the spaces between the next teeth of the rack. In this manner, the carriage-feeding movement of the rack 55 will transmit movement through the rollers 176 to the two levers 169, to first raise the aligning bars 170 from their temporary idle positions at Figure 15 to effective positions of Figure 13, to align the teeth of the gears 59 in both totalizers. Then they drop from positions at Figure 13 to Figure 15, all during the single letter-spacing movement of the rack 55.

It will be remembered that near the end of the down stroke of the key, both key-operated rock-shafts 113 and 116 were released to be restored to normal positions, and their several connections such as the sector 82 have restored the pinion 92a and the two levers 165 to normal positions; but the two latches 180 are still unresponsive to the two levers 169, because the rock-shaft 77 is still under the control of the indexing arm 71 held by the depressed numeral-key.

When the numeral-key is fully restored, the two screws 187 will pick up the latches 180, to force their noses 188 under the lugs 172, to raise the aligning bars into permanent aligning positions for the gears 59, where they remain until they are released by the depression of the next numeral-key. In this manner, the gears 59 in the operating totalizers are first aligned by the letter-spacing feed of the carriage and subsequently re-aligned upon the return of each numeral-key after the digit is computed.

The mechanism has been described according to the settings in Figure 1 for the joint use of two master gears for two adjacent totalizers. Should the character of the work require that a certain accumulation be omitted from the totalizer 124, the shifting of the control handle 149 from the position of Figure 1 to that of Figure 9 will disable the master gear 123, and the totalizer 124 will therefore be silenced.

It will be understood that with the use of the state-controlling mechanism for reversing the direction of rotation for the master gear 63, for addition or subtraction, a temporary subtractive computation may be had in the totalizer 51, and the grand totalizer may be controlled likewise.

Among other things, it will be noted that the invention includes two co-operative totalizers, two co-operative master gears, two co-operative master dogs, and a single co-operative actuating mechanism operated by the numeral-keys in typing numbers; that the two master gears are positively connected to rotate in unison, one with the other; that one master gear is disabled, not by silencing the rotation thereof, nor by operating complicated and loosely constructed clutch-devices between a master gear and a totalizer, but by the simple operation of shifting the rotating master gear out of train with its totalizer, without disturbing the correctness of the timing of the two master gears.

It will also be observed that the aligner is operated while the type-key is on its return movement. This gives the wheels time to turn before the aligner becomes effective; that this is accomplished by providing that when the carriage escapes, the aligning bar is thrown into the teeth of the register-wheels; that use is made of the rack to vibrate a small roller and an arm, which is adjustably connected to the aligning bar, so that when the rack is in motion the roller rides down and up under said rack-teeth and thereby swings the aligning bar up and down, to straighten the register-wheels; that in order to disengage said roller from the rack, so as to permit the carriage to be freely moved, a lug stud is mounted on one of the guide-links, to be latched up by a member on the indexing shaft, so that the link is normally latched in a position to elevate the aligner and hold the roller-arm depressed out of engagement with said rack; that as soon as a key is depressed, said lug is unlatched and permits the aligner to move down, and its rear arm to rock upwardly, to permit the small roller to engage the carriage-teeth; that this may take place upon the downward motion of the key; and that as soon as the key is released, the carriage escapes, permitting the aligner to straighten the register-wheels out, and then the lug is latched and said roller is rocked and held out of engagement with the rack.

It will also be noticed that the two registers need not be positioned either too far apart or too near each other, since a bracket is provided with a pair of marks which must be in alignment with the marks provided on the registers.

It is also seen that the second master wheel can be readily moved into or out of effective position, by reason of the universal joint, which eliminates both side play and backlash of said master wheel; that the universal joint reduces the quantity of parts necessary, and is also compact; and that it reduces lost motion or backlash due to meshing clutches, gears, etc.; that the second master gear-shaft is provided with a ball end, as means of mounting the bearing in its retainer-frame, the retainer being movable up and down, and a ball-bearing taking up the end-thrust, to eliminate friction; that the retaining shaft tension-spring tends to hold the right-hand master gear down when disconnected, and that the retaining shaft is also provided with a set-screw and lock-nut for the purpose of taking up or making adjustments in the end play in the clutch-shaft.

It will also be seen that in order to release the master gear, a hand-piece projecting at the front of the machine is operated to the left; that this disconnect member is provided with a detent; that a safety-device prevents the master gear from being moved into or out of effective position, while a key is partly depressed; and that this safety-device consists of a square post, which operates with the full-stroke shaft and works in front of a projection on the disconnect-lever slide, preventing the movement of the latter to either right or left while the key is in motion.

It will also be seen that the clutch-shaft center bearing is combined with an adding gear leader, made in one piece. This bearing is also provided with means for adjusting the same in respect to the master wheel to effect relative alignment; and that the second master wheel is also provided with a leader, the latter having an adjustment.

Variations may be resorted to within the scope of the invention, and portions of the improvements may be used without others.

Having thus described my invention, I claim:

1. The combination with indexing mechanism and a main master wheel, of a second master wheel connected by a universal joint to the main master wheel, and mounted to swing out of working position while so connected.

2. The combination with a set of computing gears for different denominations and key-controlled means to operate the same, of a gear-aligner, a latch normally detaining said aligner in effective position, key-controlled means for withdrawing said latch to release said aligner preparatory to operation of the gears, and means for restoring the aligner and the latch in advance of the full return of the key to normal position.

3. The combination with a set of computing gears of different denominations and key-controlled means to operate the same, of a gear-aligner normally in effective position, key-controlled means for releasing said aligner preparatory to operation of the gears, a carriage being provided to effect relative movement between the set of gears and the aligner to enable the latter to engage the gears in succession, a rack being provided upon said carriage, and means controlled by said rack for restoring the aligner to normal position.

4. The combination with a carriage, a set of computing gears of different denominations and key-controlled means to rotate the same, of a gear-aligner normally in effective position, key-controlled means for releasing said aligner preparatory to operation of the gears, and a rack operated by said carriage for restoring the aligner in advance of the full return of the key to normal position, said key-controlled aligner-releasing means effective for latching the aligner in normal gear-engaging position and out of control of said rack at said full return of the key.

5. The combination with indexing mechanism and a main master wheel, of a second master wheel connected by a universal joint to the main master wheel, and mounted to swing out of working position while so connected, means for swinging said second master wheel to idle position, and an interlocking train between the indexing mechanism and the second master wheel to prevent simultaneous operation of the indexing mechanism and the wheel-swinging means.

6. The combination with indexing mechanism and a main master wheel, of a second master wheel connected to the main master wheel, and mounted to swing out of working position while so connected, said master wheels having individual shafts, the shaft of the main master wheel being connected to the shaft of the second master wheel for universal motion, the second wheel shaft having a ball-shaped end, a swing rod having a housing for said ball-shaped end of the second shaft, said housing having a ball to operate against said end to prevent endwise displacement of the second shaft, and means co-operative with the second shaft and with a fixed part of the framework to hold the second master wheel shaft tight against axial displacement when in working position.

7. The combination with indexing mechanism and a main master wheel, of a second master wheel connected to the main master wheel, and mounted to swing out of working position while so connected, said master wheels having individual shafts, the shaft of the main master wheel being connected to the shaft of the second master wheel for universal motion, the second wheel shaft having a ball-shaped end, a swing rod having a housing for said ball-shaped end of the second shaft, said housing having a ball to operate against said end to prevent endwise displacement of the second shaft, said swing rod being placed end to end with the second shaft, and means supporting the other end of the rod against axial displacement, including a screw tapped into the end of the rod, said screw having a rounded head fitted into a depression in a fixed part of the frame whereby the rod is pivoted for its swinging movement, and means for securing said screw where adjusted, whereby the second shaft when operative is held tight in axial direction.

8. The combination with indexing mechanism and a main master wheel, of a second master wheel connected to the main master wheel, and mounted to swing out of working position while so connected, said master wheels having individual shafts, the shaft of the main master wheel being connected to the shaft of the second master wheel for universal motion, the second wheel-shaft having a ball-shaped end, a swing rod having a housing for said ball-shaped end of the second shaft, said housing having a ball to operate against said end to prevent endwise displacement of the second shaft, means co-operative with the first shaft, the swing rod, and with a fixed part of the framework to hold the second master-wheel shaft tight against axial displacement when in working position, a sliding mount adjacent to said rod, said mount having a projection upon which said rod is normally sustained, said rod having a peripheral groove to permit the rod and the second shaft-section to fall when said projection is brought beneath said groove, and a finger-piece upon said mount to manipulate the same, and a detent for holding the mount in either working or idle position.

9. The combination with indexing mechanism and a main master wheel, of a second master wheel connected to the main master wheel, and mounted to swing out of working position while so connected, said master wheels having individual shafts, the shaft of the main master wheel being connected to the shaft of the second master wheel for universal motion, a swing rod engaging the end of the second shaft, to prevent endwise displacement of the second shaft, means co-operative with the first shaft, the swing rod, and with a fixed part of the framework to hold the second master-wheel shaft against axial displacement when in working position, a mount adjacent to said rod, said mount having a projection upon which said rod is normally sustained, said rod having a peripheral groove to permit the rod and the second shaft-section to fall when said projection is brought beneath said groove, a finger-piece upon said mount to manipulate the same, a lug upon said mount, and a projection upon said indexing mechanism to co-operate with said lug to prevent dropping of the swinging shafts while the indexing mechanism is in operation, and to prevent operation of the indexing mechanism during the dropping of the shafts.

10. The combination with indexing mechanism and a main master wheel, of a second master wheel connected to the main master wheel, and mounted to swing out of working position while so connected, said master wheels having individual shafts, the shaft of the main master wheel being connected to the shaft of the second master wheel for universal motion, a swing rod engaging the end of the second shaft, means co-operative with the first shaft, the swing rod, and with a fixed part of the framework to hold the second master-wheel shaft tight against axial displacement when in working position, a sliding mount adjacent to said rod, said mount having a projection upon which said rod is normally sustained, said rod having a peripheral groove to permit the rod and the second shaft-section to fall when said projection is brought beneath said groove, a finger-piece upon said mount to manipulate the same, and a detent for holding the mount in either working or idle position, a spring being provided to draw the second master wheel out of effective position when released by the sliding movement of said mount.

11. The combination with a set of computing gears of different denominations and key-controlled means to operate the same, of a gear-aligner normally in effective position, key-controlled means for effecting the withdrawal of said aligner preparatory to operation of the gears, a carriage being provided to effect relative movement between the set of gears and the aligner, to enable the latter to engage the gears in succession, and operating keys, said carriage having a truck upon which the gears are mounted, the carriage and truck being started in motion promptly with the first part of the up stroke of the operating key, and a carriage rack having a camming action upon the aligner, throwing the latter into mesh with the gears upon the movement of the carriage.

12. The combination with a set of computing gears of different denominations and means including keys to operate the same, of a gear-aligner, a latch normally holding the aligner in effective position, key-controlled means for withdrawing the latch from said aligner preparatory to operation of the gears, a carriage being provided to effect relative movement between the set of gears and the aligner, to enable the latter to engage the gears in succession, said carriage having a truck upon which the gears are mounted, the truck being started in motion promptly with the first part of the up stroke of the operating key, said aligner forming part of a lever, a rack upon said carriage, the rack having a camming action upon the aligner-lever, throwing the aligner into mesh with the gears at the completion of the return of the key to normal position, and means for returning said latch to normal position, to maintain said aligner out of control of said rack.

13. The combination with a set of computing gears of different denominations and key-controlled means to operate the same, of a gear-aligner normally in effective position, key-controlled means for releasing said aligner preparatory to operation of the gears, a carriage being provided to effect relative movement between the set of gears and the aligner, to enable the latter to engage the gears in succession, a rack being provided upon said carriage, and means controlled by said rack for restoring the aligner to normal position, said aligner forming a lever having two arms, one of which carries the aligner, and the other of which is adjustable relatively thereto and carries a roll for co-operation with said rack.

14. The combination with a set of computing gears of different denominations and key-controlled means to operate the same, of a gear-aligner normally in effective position, said aligner being releasable preparatory to operation of the gears, a carriage being provided to effect relative movement between the set of gears and the aligner, to enable the latter to engage the gears in succession, a rack being provided upon said carriage, means controlled by said rack for restoring the released aligner to normal effective position, an indexing mechanism, and a latch releasable by said indexing mechanism and normally latching said aligner in effective position out of control of said rack.

15. In a computing machine, the combination of numeral-keys, a pair of master gears operated by the keys and constantly coupled together to operate simultaneously, and means to disable one master gear without disabling the other, said means including a slide operable to raise and lower one master gear into and out of working position while remaining positively connected to the other master gear.

16. In a computing machine, the combination of a carriage having a totalizer with gears, a master wheel to rotate the gears seriatim, and an aligner swingably mounted on the framework and operated by the carriage to align the gears after each actuation by the master wheel.

17. In a computing machine, the combination of a traveling carriage, a totalizer therefor having a series of gears, a master wheel, and a bar operable by the travel of the carriage to realign the series of gears after each actuation thereof by the master wheel.

18. In a computing machine, the combination of a carriage, totalizers, a set of numeral-keys, indexing mechanism, master gears, each in train to drive a totalizer, a two-part shaft joined together by a coupling, one part of the shaft driven by said indexing mechanism to drive the other part in unison, one of said master gears being secured to each part of the shaft to drive totalizers in unison, and means effective upon one shaft part to silence one totalizer by withdrawing its master gear therefrom while maintaining its connection to the other master gear.

19. In a computing machine, the combination of a carriage, totalizers, numeral-keys, indexing mechanism, master wheels, means shiftable to silence one master wheel, and means controlled by said silencing means to prevent the operation of the indexing mechanism until the completion of the movement of said silencing means.

20. In a computing machine, the combination of a letter-spacing carriage, a totalizer movable with the carriage and having gears, a series of numeral-keys, a master wheel driven by the keys to operate the gears seriatim, a bar that normally locks the aligned gears in the totalizer, means whereby the depression of a numeral-key withdraws said bar from the gears before rotation thereof by the master wheel, and means to put said bar under the control of said carriage, to be restored to realign the gears during the letter-spacing movement of the totalizer with the carriage.

21. In a computing machine, the combination of a carriage having a rack and a totalizer with gears, a stationary frame, a master wheel engageable seriatim with the gears, and a lever mounted in the actuator frame having an aligning cam at one end to contact with the gears, and having a roller to ride over the teeth of the rack to vibrate the aligning cam at the opposite end of said lever into engagement with the gears, upon movement of the carriage due to the operation of the numeral keys.

22. The combination with a set of computing gears for different denominations and key-controlled means to operate the same, of a gear-aligner normally in effective position, key-controlled means for releasing said aligner preparatory to operation of the gears, a carriage being provided to effect relative movement between the set of gears and the aligner, to enable the latter to engage the gears in succession, and means controlled by said carriage for restoring the aligner in advance of the full return of the key to normal position.

23. The combination with indexing mechanism and a main master wheel, of a second master wheel connected to the main master wheel, and mounted to swing out of working position while so connected, said master wheels having individual shafts, the shaft of the main master wheel being connected to the shaft of the second master wheel for universal motion, the second wheel shaft having a ball-shaped end, a swing rod having a housing for said ball-shaped end of the second shaft, said housing having a ball to operate against said end to prevent endwise displacement of the second shaft, said swing rod being placed end to end with the second shaft, and means supporting the end of the rod against axial displacement.

24. In a computing machine, the combination of a carriage, totalizers, numeral-keys, indexing mechanism, master wheels, means shiftable to silence one master wheel, and means to prevent the operation of said silencing means during the operation of the indexing mechanism.

25. In combination a travelling carriage carrying a toothed rack, a totalizer with digit wheels and an aligner for the totalizer operative by the toothed rack as the carriage moves to align the wheels, keys and connections for operating the wheels, said keys also operative to release the aligner while the carriage is stationary.

26. In a computing machine, the combination of a travelling carriage, a rack and a plurality of totalizers each totalizer including a series of gears, a master wheel for setting up digits in said totalizers, a swingable gear aligner on the machine framework and means on said aligner cooperative with said rack whereby the travel of the carriage swings the aligner to cam the series of gears of a totalizer into alignment.

27. The combination of a carriage, a master wheel, a single set of ten carriage-controlling numeral type keys, means for enabling any key to operate the master wheel, a totalizer having a series of digit wheels and being settable along the carriage, a digit wheel aligner normally in effective position, said aligner being timed co-ordinately with the timing of the stroke of the master wheel, means controlled by the keys for withdrawing the aligner from the digit wheels preparatory to the operation of the master wheel, a carriage rack, a restoring element associated with said aligner, and movable into a notch in said rack upon release of the numeral key, simultaneously with the withdrawal of the aligner from the digit wheels, said restoring element co-operative with the rack and carriage, for restoring the aligner to effective position, at the start of the return of the operated numeral key to normal position, and means releasable by any key upon the subsequent printing stroke thereof, for automatically latching the aligner in effective position.

OTTO THIEME.